INVENTORS
ROBERT B. ALBRIGHT
EDWARD J. MICHONSKI
FRANCIS RICHARDSON

BY Carl H. Synnestvedt

AGENT

July 5, 1960 R. B. ALBRIGHT ET AL 2,944,119
TRANSDUCERS
Filed Dec. 20, 1957 2 Sheets-Sheet 2

INVENTORS
ROBERT B. ALBRIGHT
EDWARD J. MICHONSKI
FRANCIS RICHARDSON
BY
AGENT

Patented July 5, 1960

2,944,119
TRANSDUCERS

Robert B. Albright, Wyndmoor, Edward J. Michonski, Churchville, and Francis Richardson, Philadelphia, Pa., assignors to Philco Corporation, Philadelphia, Pa., a corporation of Pennsylvania Filed Dec. 20, 1957, Ser. No. 704,175

10 Claims. (Cl. 179—111)

The present invention relates to means for generating sound, and more particularly to electro-acoustic transducers of the electrostatic or condenser type.

The present invention is an improvement in apparatus of the type disclosed and claimed in the co-pending application of Lloyd J. Bobb, Serial No. 679,290, filed August 20, 1957, and assigned to the assignee of the present invention. Briefly, the above-identified co-pending application discloses a pair of single-ended electro-acoustic transducers, or loudspeakers, so mounted and driven as to form a system which achieves acoustic performance comparable to that of a double-ended speaker; this system comprises single-ended loudspeakers in oppositely facing, closely acoustically coupled, push-pull driven arrangement, which obtains an unusually high degree of fidelity.

In order fully to maintain the aforementioned high degree of fidelity, over a long period of time, it is important to provide proper tensioning of the relatively thin vibratile membranous diaphragm utilized as a condenser electrode in apparatus of this type.

It is therefore a broad object of the present invention to provide, in an electro-acoustic transducer, novel and improved means for placing and maintaining the vibratile membranous diaphragm under controlled tension.

It is also an object of the invention to provide tensioning means which is so constructed and arranged as to make it possible to minimize the overall dimensions of single-ended electrostatic speakers coupled in the above-described manner, while maintaining optimum operational efficiency.

In accordance with general features of a preferred embodiment of the invention, a vibratile diaphragm is tensioned over backing plate means having the approximate form of a flattened hollow cylinder, the maximum thickness of which is generally less than one-half of the wave length of any sound to be reproduced; the diaphragm is maintained under proper tension, and suitable conductor means is provided for electrostatically operating the diaphragm in push-pull.

In the achievement of the foregoing and other objectives, and with reference to a preferred embodiment of the invention, there is utilized a pair of backing plates each having concave and convex sides, the concave sides of the plates being presented toward one another, and each said plate comprising an electrode of a condenser. Preferably, the plates are of partially cylindrical form, and the assembly formed by the pair of plates is encircled by a sleeve-like membranous diaphragm which comprises another electrode of the condenser. Means urging said backing plates apart and against the sleeve maintains both tension in the latter and supporting frictional engagement of the sleeve with the backing plates.

An important feature of this invention resides in the novel arrangement of the opposed, outwardly curved backing plates wherein tensioning force is applied through the backing plates to an encircling continuous vibratile membrane, thereby obviating the need for separate membrane gripping or clamping devices.

The manner in which the foregoing objects and advantages of the invention may best be achieved will be more fully understood from a consideration of the following detailed description taken together with the accompanying drawings in which.

Figure 1:
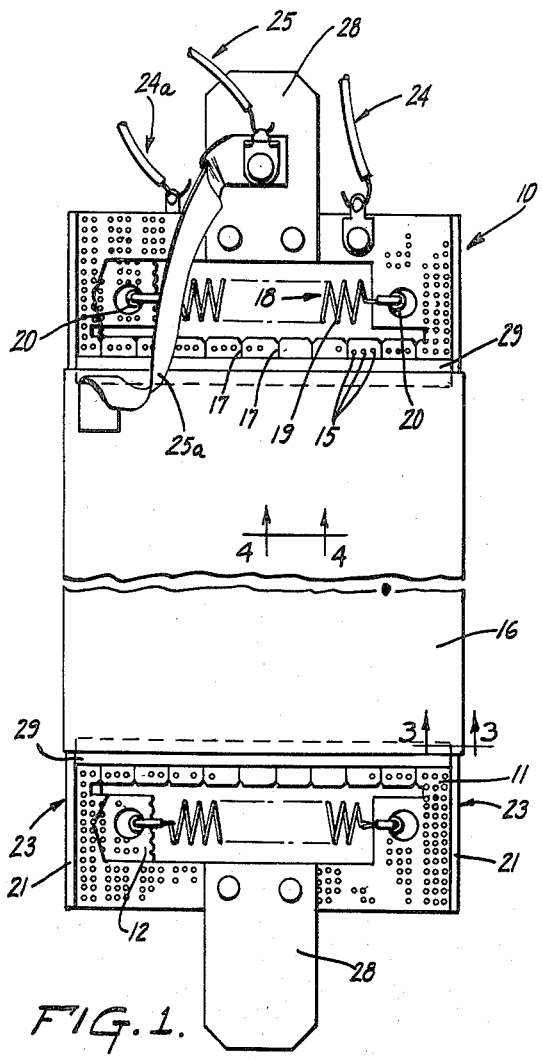
Figure 1 is an elevational view, with parts broken away, of an electrostatic sound reproducer embodying the principles of the invention.
Figure 2:
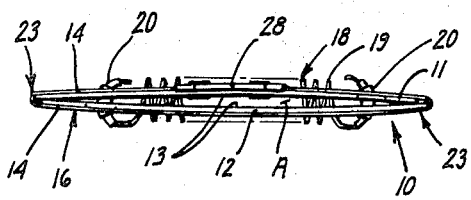
Figure 2 is a view looking toward the lower end of the reproducer as viewed in Figure 1.

Now making more detailed reference to the drawings and initially to Figures 1 and 2 thereof, it will be seen that the transducer or loudspeaker 10 comprises a pair of foraminous, electrically conductive, rigid backing plates 11 and 12, each having concave and convex sides 13 and 14, respectively, the concave sides 13 being presented toward one another. The resultant curvilinear shape has certain advantages, such as rigidity and wide distribution of high frequency energy without introduction of objectionable harmonic distortion.

Preferably plates 11 and 12 are fabricated from a sheet of metal, for example, light gauge aluminum has been found to be satisfactory. As indicated, plates 11 and 12 are foraminous and in this regard it will be noted that they are provided with a very large number of minute circular apertures or perforations 15, and since the diameter of these perforations is large as compared with the axial length thereof, a high degree of acoustical transparency is achieved. As will be understood, it is important that the backing plates be, essentially, acoustically transparent not only to minimize power losses due to acoustic resistance of air included in the regions B between the backing plates 11 and 12 and portions of the vibratile diaphragm 16 overlying the same, but mainly to provide the desired acoustic coupling between the aforementioned two diaphragm zones or portions, by means of air cushion A.

Figure 4:
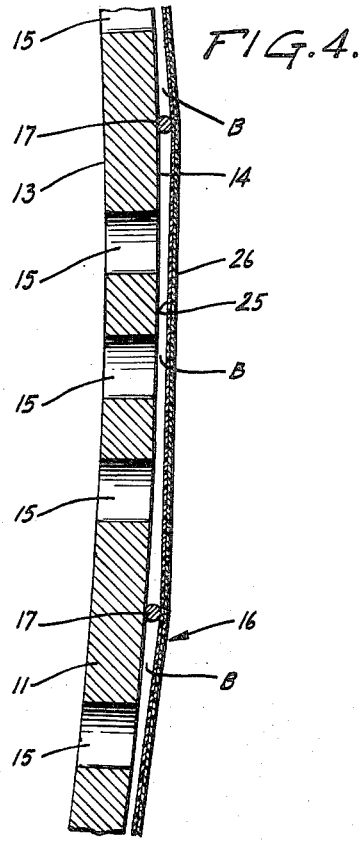
Figure 4 is a more enlarged fragmentary sectional view looking generally in the direction indicated by the line 4—4 applied to Figure 1.
Figure 3:
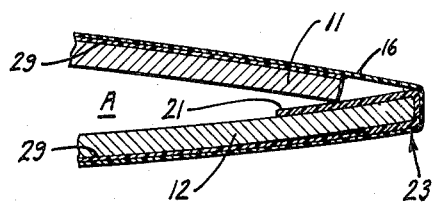
Figure 3 is a somewhat enlarged fragmentary sectional view looking generally in the direction 3—3 of Figure 1.
Figure 5:
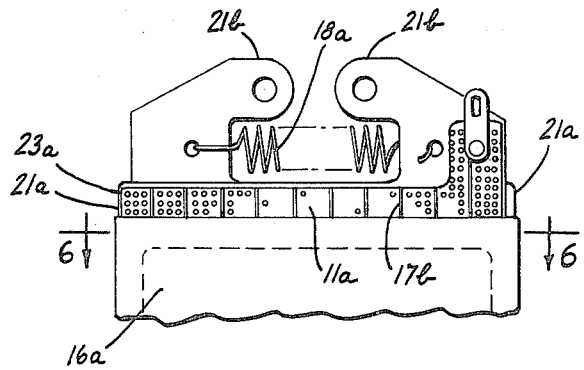
Figure 5 is a view similar to Figure 1, and showing a modified embodiment of the invention.
Figure 6:
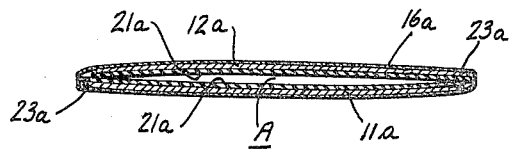
Figure 6 is an elevational view in section looking in the direction indicated by line 6—6 of Figure 5.

As seen to advantage in Figures 2 and 3, diaphragm 16 is a continuous sleeve-like member, comprising (Figure 4) an insulating sheet 25 provided with an electrically conductive coating 26, said member closely encircling the convex side 14 of each backing plate 11 and 12. In order to allow substantial vibration of the diaphragm on the stationary backing plates, spacer members 17 are provided, as best seen in Figures 1 and 4. Such members comprise a series of thread or wire sections preferably extending over smooth non-perforated portions of the exposed surfaces of each plate 11 and 12 in a direction parallel to the axes of the curved plates. By way of example, the ends of such threads may be anchored on each plate by known fastening means (not shown). It will be understood, from the description of apparatus shown in Figures 5 and 6, that spacer members 17 may take other forms.

Mounting of the novel apparatus is accommodated by tabs 28 affixed to one of said backing plates, for example the plate 11.

As best seen in Figure 3, each of the curved backing plates is insulated from the other by a dielectric strip 21 held in place, for example by a suitable adhesive backing. Also, as seen at 29 in Figures 1 and 3, a relatively narrow tape-like piece, or strip of dielectric material is disposed intermediate the edge portions of the diaphragm 16 and the underlying exposed backing plates; it is the purpose of this tape to prevent arcing between the diaphragm conductive coating 26 and the electrically conductive backing plates, around edges of the diaphragm.

The tensioning of diaphragm sleeve 16 over spacer means 17 is achieved, in accordance with one aspect of the invention, as seen in Figures 1 and 2, by a pair of resilient means 18 extending between and tending to slide the backing plates 11 and 12 laterally relative to one another in such manner that edge portions 23 of the plates, insulated by dielectric strips 21, bear against the sleeve in opposite directions, thereby tensioning the sleeve against spacer members 17, as well as providing frictional mounting restraint of the sleeve on the backing plates. Each resilient means 18 comprises a tension spring 19, provided with suitably insulated terminal portions 20, the tips 20 shown at the right engaging backing plate 11 and those shown at the left engaging backing plate 12.

The construction and arrangement of the backing plates and the encircling diaphragm is such as to provide spacing A between opposed diaphragm portions, contacting the backing plates, in the order of less than one half of the wave length of any sound to be reproduced by the transducer. The principle by which the beneficial effect of this spacing is determined is fully set forth in the above-identified co-pending application. In addition further brief reference thereto is made hereinafter.

Suitable terminal means for driving the transducer in push-pull includes lead wire means 24 attached to backing plate 11, lead wire means 24a attached to backing plate 12, and lead wire means 25, terminating in a relatively thin conductive strip 25a attached to the single diaphragm 16, the latter having portions overlying each of the aforesaid backing plates. Thus, each backing plate can be biased independently, thereby permitting driving of the diaphragm portions confronting the backing plates in suitable cooperation with one another.

Manufacture of the new apparatus is very simple, the backing plates can be cut from suitable readily available material, such as perforated aluminum plate, which has a slight cylindrical curvature and to which the spacers are suitably attached. Slight irregularities may be present in the plate surface; however adequate spacing of the vibratory diaphragm from the plate can be established, when the plate is properly curved, for example, if it has a rise of $\frac{1}{16}''$ in an arc of 3 or 4 inches length. The diaphragm sleeve 16 (see Figure 4) can be made of thin, strong, insulating sheet material 25 such as that known as "Mylar," a type "A" polyester manufactured by E. I. du Pont de Nemours and Company, provided with a suitable conductive coating 26. Preferably, and in accordance with known principles, the thickness of coating 26 amounts only to a small fraction of a mil; the thickness of the entire membrane 16 amounts to a larger fraction of a mil; and the thickness of the flat air space B which is maintained by the spacers, between the membrane, or diaphragm, and the backing plate, is of the order of not more than a very few mils, to maintain high electro-acoustic sensitivity.

Referring again to the thickness of the air cushion A, or acoustic coupling region, it is pointed out that this dimension is important and even critical, because of the necessity of controlling disturbing harmonics in a transducer system which shall achieve the results and advantages of the present invention. It has been found necessary to limit the thickness of said space, which is measured between opposing membranes or diaphragm portions overlying backing plates 11 and 12, to a value which is generally smaller than one-half wavelength of the harmonics to be suppressed, as explained in the co-pending application.

It will be understood that, by so arranging the curved backing plates as to include the air coupling region A between the concave sides of the plates and thus in effect holding the backing plates together by the diaphragm member, as well as providing support of the latter upon the backing plates, there is accommodated a substantial decrease in overall dimensions and bulk of a pair of curved, closely acoustically coupled single-ended electrostatic speakers for driving in push-pull. It will also be appreciated that such an arrangement eliminates the need for a separate force-supplying means such as a pressure bar for tensioning the sleeve-like diaphragm encircling the backing plates, inasmuch as tensioning force is applied to the sleeve through the backing plates, exclusively and directly. This novel arrangement also makes much more complete acoustical use of the entire sleeve diaphragm than was done in prior speakers using such a diaphragm. While thus simplifying the construction and reducing the cost thereof, the new design also contributes to the provision of a high degree of acoustic fidelity, by eliminating the rivets or the like which formerly were used to hold and/or electrically connect the membrane, or diaphragm, and by diminishing all membrane areas which are not electrostatically subjected to controlled acoustic vibration.

In operation, transducer sections of the loudspeaker comprising diaphragm portions overlying separate backing plates 11 and 12 have a polarizing voltage applied thereto in order to hold the diaphragm under suitable tensioning for proper vibration, the diaphragm portions overlying the backing plates being biased by such voltage toward each backing plate, as is known and usual in single-ended speakers. For example, a suitable source of biasing voltage (not shown) is connected through the said lead wire means 24, 24a and 25 in such manner that the diaphragm is connected to one side of the source of polarizing voltage and the backing plates are connected to the other side of said source. As the speakers face in opposite directions, the polarizing forces bias the said active diaphragm portions toward one another.

Signal voltages, in push-pull, are superimposed on the polarizing voltages through the lead means 24, 24a and 25 to the conductive backing plates, and in accordance with known practice.

It is, of course, to be understood that novel features of the present invention may be embodied in apparatus other than that hereinbefore described. For example, the embodiment illustrated in Figures 5 and 6 comprises a pair of insulating spacers 21a fastened to confronting concave surfaces of the backing plates 11a and 12a, and lateral edge portions of the spacers 21a extend slightly beyond edges 23a of the backing plates. In order to accommodate the desired acoustic coupling between diaphragm portions overlying backing plates 11a and 12a, central portions of the spacers 21a are open, as indicated by the hidden line showing of Figure 5. Spacers 21a include tab portions 21b by which the transducer may be mounted. Resilient tensioning means, or spring 18a, extends between each of the insulating spacers 21a whereby each of the backing plates 11a and 12a is urged in opposite directions and the aforesaid extended edge portions of spacers 21a engage the encircling diaphragm sleeve 16a. Tensioning of the diaphragm is accomplished in accordance with the principles described in connection with the embodiment of Figures 1 to 3. By way of example, spacer means in this embodiment take the form of small ridges 17a formed in the backing plates 11a, and disposed in a pattern similar to that of spacers 17 as seen in Figures 1 and 4.

Figure 7:
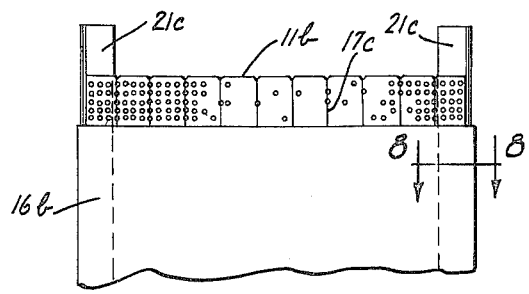
Figure 7 is a view similar to Figure 5, and showing still another modified embodiment of the invention.
Figure 8:
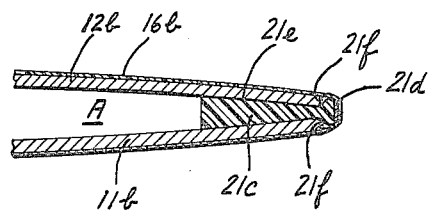
Figure 8 is a somewhat enlarged fragmentary sectional view, in elevation, and looking in the direction of the line 8—8 as applied to Figure 7.

Still another and somewhat simplified embodiment is shown in Figures 7 and 8, wherein curved backing plates 11b and 12b are urged against a sleeve-like diaphragm 16b through the agency of narrow, elongated, wedge-like combined insulating-spacing members 21c engaging narrow concave surface portions, as well as edge portions of the backing plates, as seen at 21e and 21f, respectively. Again, spacer means for the diaphragm comprises thread like members 17c, but the latter may extend over perforated regions of the backing plates as illustrated.

Assembly of this embodiment comprises disposing curved backing plates 11b and 12b in the positions shown, and encircling the backing plates with sleeve-like diaphragm 16b, the latter having an inner periphery slightly greater than the combined convex surface peripheries of the plates. Subsequent steps include seating one spacer 21c in the position shown in Figure 8 and inserting the other spacer 21c in position opposite to the seated spacer, but spaced inwardly from the edges of backing plates 11b and 12b. The unseated spacer is then urged laterally away from the seated spacer, and into its seated position. Thus, by virtue of the peripheral length presented by the combined convex surfaces of the backing plates and edges 21d of the spacers 21c being slightly greater than the length of the encircling diaphragm 16b, the latter is stretched within its elastic limit and thereby tensioned against the backing plates. In this embodiment the spacers 21c reacting through spacer edges 21d against the somewhat resilient diaphragm 16b accommodate any small variations in sleeve dimensions, for example such variations as are due to climatic changes or cold flow. In the event optimum resilience is not provided by the diaphragm, additional resilience augmenting that of the diaphragm may be obtained by making spacers 16b of a suitable resilient material, such as rubber or the like. Also, rounded edges 21d of the spacers 21c present a uniform surface reacting against the sleeve, thereby ensuring wrinkle-free tensioning of the latter.

Although electrical terminals for the embodiments shown in Figures 5 to 8 have not been illustrated, it is of course to be understood that such terminals may be provided in accordance with electrical circuitry illustrated and described in connection with Figures 1 and 2.

While in each of the embodiments illustrated there has been provided a continuous membrane coated with a continuous conductive material in combination with a pair of backing plates insulated from one another, it is to be understood that the backing plates may be disposed in electrical contact with one another, and that the continuous membrane may be coated with conductive material only in the two regions extending across the wire spacers of the two backing plates, in which case the connecting circuitry would be modified correspondingly.

We claim:

1. In an electro-acoustic transducer, a pair of perforated backing plate sections so arranged as to form a hollow, flattened cylinder, a thin vibratory membrane having an electrically conductive surface and encircling said sections, and means for moving said sections bodily relative to one another and against said membrane.

2. In an electro-acoustic transducer, a pair of curved perforated backing plates so arranged as to form a substantially hollow flattened cylinder; a thin vibratory membrane extending over each said backing plate; and means for urging said backing plates slidingly apart and against said vibratory membrane to tension the latter.

3. In an electro-acoustic transducer: a pair of foraminous, electrically conductive, relatively rigid backing plate sections having concave and convex sides, said concave sides being presented toward one another; a sleevelike diaphragm disposed about said backing plate sections closely encircling said convex sides; and means for urging said sections against the inside of said diaphragm to place the latter in tension and provide frictional force to maintain the position of said diaphragm.

4. In an electro-acoustic transducer: a pair of foraminous, electrically conductive, relatively rigid backing plates having concave and convex sides, said concave sides being presented toward one another; a sleevelike electrically conductive diaphragm disposed about said backing plates closely encircling said convex sides; and means for insulating said backing plates one from the other and bearing against the inside of said diaphragm to place the latter in tension and provide frictional force to maintain the position of said diaphragm.

5. In an electro-acoustic transducer: a pair of foraminous, electrically conductive, relatively rigid backing plates having concave and convex sides, said concave sides being presented toward one another; a sleevelike diaphragm having an outer electrically conductive surface portion and an inner electrically insulative surface portion disposed about said plates closely encircling said convex sides; and means for urging said backing plates slidingly apart against the inner surface portion of said diaphragm to place the latter in tension and provide frictional force to maintain the position of said diaphragm.

6. In an electro-acoustic transducer: a pair of foraminous, relatively rigid backing plates each having a concave side and a convex side, said concave sides being presented toward one another; a sleeve-like, continuous membranous diaphragm disposed about said backing plates and closely encircling the convex sides of the latter; and combined insulating-spacing means separating said backing plates while engaging said diaphragm to urge the latter against said plates, thereby tensioning the diaphragm and frictionally mounting it upon said backing plates.

7. In an electro-acoustic transducer: a pair of foraminous, electrically conductive, relatively rigid, closely spaced backing plates having concave and convex sides, and having said concave sides presented toward one another; means for insulating said backing plates, one from the other; a sleeve-like, continuous membranous diaphragm disposed about said backing plates closely encircling said convex sides; and means including a spring engaging each said backing plate for urging the latter slidingly apart and against said diaphragm.

8. In an electro-acoustic transducer: a pair of foraminous, relatively rigid backing plates each having a concave side and a convex side, said concave sides being presented toward one another; a sleeve-like, continuous membranous diaphragm disposed about said backing plates and closely encircling the convex sides of the latter; relatively rigid insulating members secured to said backing plates, separating the latter, and projecting therefrom; and means including a spring reacting between projecting portions of said members and urging the latter against said diaphragm to place the same in tension.

9. In an electro-acoustic transducer, perforated backing plate means comprising a pair of semi-cylindrical confronting plate sections disposed to form a hollow flattened cylinder, a thin vibratory membrane encircling said backing plate means and free of securement thereto, and means slidingly urging said plate sections across one another and against said membrane both to tension and retain the latter.

10. In an electro-acoustic transducer assembly, a pair of foraminous electrically conductive, relatively rigid individual backing plate portions having concave and convex sides, said concave sides confronting one another, a sleeve-like diaphragm disposed about said backing plate portions closely encircling said convex sides, and means for maintaining the aforesaid assembly of said backing plate portions and diaphragm in assembled relation, comprising force producing means disposed to urge said plate portions apart and against said diaphragm.

References Cited in the file of this patent

UNITED STATES PATENTS

| 1,764,008 | Crozier | June 17, 1930 |

FOREIGN PATENTS

| 34,610 | Denmark | June 3, 1925 |
| 944,734 | Germany | June 21, 1956 |